M. ROSENBAUM.
METHOD OF OPERATING A FURNACE.
APPLICATION FILED MAY 24, 1912.
1,108,792.
Patented Aug. 25, 1914.
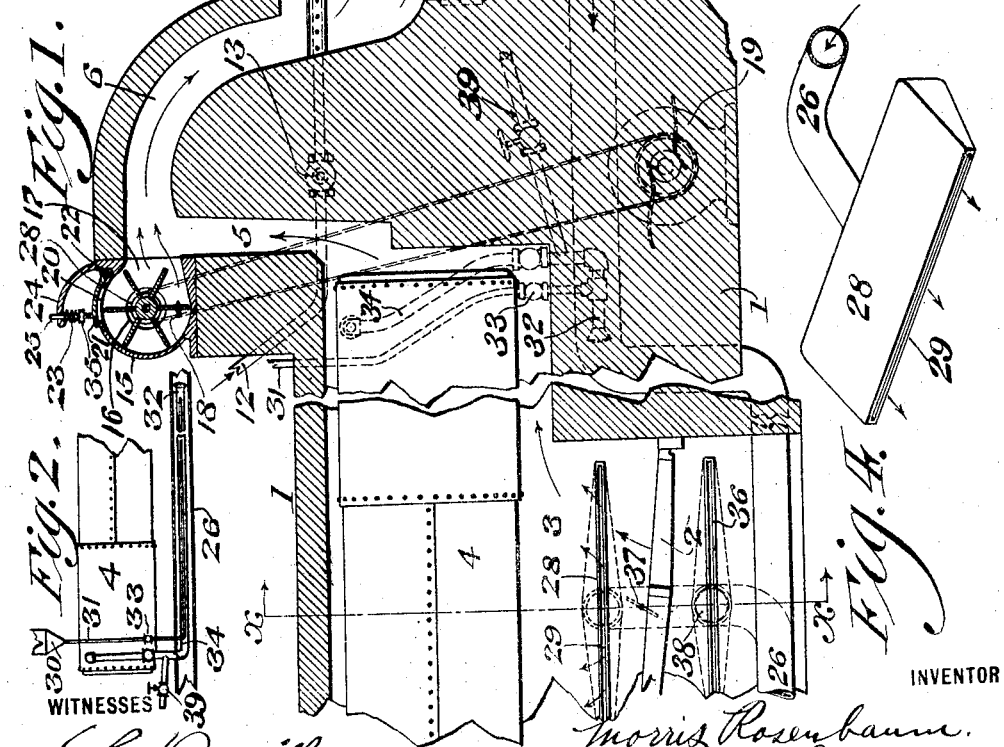
INVENTOR
Morris Rosenbaum

UNITED STATES PATENT OFFICE.

MORRIS ROSENBAUM, OF PHILADELPHIA, PENNSYLVANIA.

METHOD OF OPERATING A FURNACE.

1,108,792.   Specification of Letters Patent.   Patented Aug. 25, 1914.

Application filed May 24, 1912. Serial No. 699,556.

*To all whom it may concern:*

Be it known that I, MORRIS ROSENBAUM, a citizen of the United States, residing in the city and county of Philadelphia, State of Pennsylvania, have invented a novel Method of Operating a Furnace, of which the following is a specification.

My invention consists in its broad and generic scope of a novel means of operating a furnace wherein the unconsumed products of combustion are mixed with air and returned to the combustion chamber or the ash-pit of the furnace, and prior to their introduction into the combustion chamber or ash-pit such unconsumed products of combustion are enriched with liquid hydrocarbon, preferably injected thereinto by steam under pressure.

My invention further consists of a novel construction of a combustion agitator and carbon and heat reclaiming system in which a large percentage of the carbon and heat which ordinarily escapes to the atmosphere with the waste products of combustion is recovered, means being provided for causing the smoke and gases to be mixed with air and returned preheated to the combustion chamber for further combustion.

It further consists of novel means for recovering the carbon from the waste products of combustion.

It further consists of novel means of enriching the mixture of air and waste products of combustion before they are returned to the combustion chamber of the furnace.

It further consists of a novel construction and arrangement of a conduit for the waste products of combustion, and novel means for causing the gases to circulate therethrough.

It further consists of other novel features of construction, all as will be hereinafter fully set forth.

For the purpose of illustrating my invention, I have shown in the accompanying drawings one form thereof which is at present preferred by me, since the same has been preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional elevation of a furnace having a device embodying my invention employed in conjunction therewith. Fig. 2 represents a side elevation, partly in section, of a portion of my device. Fig. 3 represents a sectional elevation on a reduced scale of a portion of my device. Fig. 4 represents a perspective view of a delivery nozzle. Fig. 5 represents a section on line *x—x* Fig. 1.

Similar numerals of reference indicate corresponding parts in the figures.

Referring to the drawings:—1 designates a furnace of any desired type or conventional or desired construction and which, in the present instance, is shown as provided with grates 2, a combustion chamber 3, a boiler 4 and a conduit 5 through which the waste products of combustion pass from the combustion chamber.

In furnaces as heretofore constructed, the waste or unconsumed products of combustion pass from the furnace into the atmosphere, but in my novel device the conduit 5 communicates with a laterally extending conduit 6 constructed in any desired manner and, in the present instance, extending downwardly and communicating with a chamber 7, the bottom wall of which is provided with a desired number of cup shaped depressions 8, the bottom ends of which form receptacles 9, provided with doors 10 at the outer end. The upper wall of the chamber 7 may have any desired conformation and, in the present instance, I have shown the central portion thereof as being arched, as indicated at 11.

12 designates a conduit communicating with a source of fluid supply, such as for example water, and provided with a controlling valve 13, it being understood that this conduit 12 extends into or through the chamber 7 and is provided with a multiplicity of discharge ports 14.

15 designates draft producing mechanism which, for convenience of illustration, I have shown as consisting of a fan having inlet ports 16 through a side thereof in the usual manner and provided with a discharge port 17 which communicates with the conduit 6. The draft producing mechanism 15 may be driven in any desired manner and is shown, in the present instance, as being driven by means of a belt 18, which latter is actuated by an electric motor 19. The draft producing mechanism 15 is preferably provided with a port 20 which is normally closed by means of a relief valve 21 which is pivoted at 22, said valve being maintained in closed position by means of a spring 23 interposed between the valve 21 and a guide bracket 24 through which a pin 25, carried by the valve 21, is adapted to pass.

The combustion chamber 7 communicates with a conduit 26, which latter is provided at its inlet with a screen or filtering device 27. The conduits 26, the number of which may vary as desired, terminate in a nozzle 28 having an elongated discharge port 29 which is shown, in the present instance, as consisting of a narrow slot which discharges laterally into the combustion chamber 3 above the grate 2.

30 designates a source of liquid or other fuel supply, such as hydrocarbon, which communicates by means of a conduit 31 with an injector 32, a suitable valve 33 being provided. The injector 32 discharges into a conduit 26 and steam is conducted to the injector 32, in the present instance, by means of a valve controlled conduit 34 leading from the boiler 4.

In some cases arising in practice it is advantageous to discharge the unconsumed products of combustion passing through the conduit 26 into the ash-pit beneath the grates, instead of above the grates, and in this case if desired the enrichment of the gases may be dispensed with. In order to accomplish this, I provide a desired number of nozzles 36 which also communicate with the conduit 26 after it passes through the ash-pit in order to have the gases heated therein to a desired temperature, said discharge nozzles 36 corresponding in construction to the discharge nozzles 28.

In order that a nozzle 28 or 36 may be cut off as desired, I provide for this purpose valves 37 and 38, as will be clearly understood by reference to Fig. 5.

The operation of my device will now be clearly understood by those skilled in the art to which this invention appertains and is as follows:—The grates may be charged with fuel in any desired or conventional manner and the unconsumed products of combustion will pass from the combustion chamber 3 through the conduit 5. Assuming that the motor 19 has been set in motion, the draft producing mechanism 15 will cause the unconsumed products of combustion passing through the conduit 5 to be mixed with air and forced through the conduit 6 into the chamber 7, and the water or other liquid discharging from the ports 14 will cause the carbon to be deposited in the receptacles 9, from which such carbon can be removed upon the opening of the doors 10. The gases which have been thus purified and mixed with air pass through the filtering device 27 and thence through the conduit 26 to the discharge nozzles 28, so that the smoke and unconsumed products of combustion after having been mixed with air, are passed into the furnace above the bed of fuel for further combustion. In many cases arising in practice it is desirable to enrich this mixture of air and unconsumed products of combustion before it enters the combustion chamber, and the means shown for accomplishing this purpose consists of the fuel injector 32, by means of which the mixture of air and unconsumed products of combustion have mixed therewith hydrocarbon and steam in any desired proportion.

In case the pressure within the furnace becomes too high, then the relief valve 21 will open against the tension of the spring 23, and such excess pressure will pass to the atmosphere through the port 20, it being understood that the tension of the spring 23 may be adjusted as desired by means of the nut 35 having threaded engagement with the pin 25.

It will now be apparent that in carrying out my novel method the unconsumed products of combustion have imparted thereto a desired pressure, and if desired are treated with water or other liquid in order to form a deposition of carbon which can be recovered and removed. The unconsumed products of combustion which have been mixed with air are then caused to pass through a conduit, in conjunction with which means are provided for atomizing liquid hydrocarbon into said conduit by means of steam under pressure, after which the enriched mixture passes through the ash-pit of the furnace beneath the bed of fuel and is then discharged through the discharge slot 29 into the combustion chamber beneath or above the bed of fuel. If desired the discharge nozzle 28 may be cut out by closing the valves 37, in which case the valve 38 is opened and the gases are permitted to pass through the nozzle 36 beneath the grate for primary combustion. It will thus be seen that it is within the scope of my invention to utilize the products of combustion passing from the furnace either for the purpose of increasing the primary combustion, as is the case when the gases are discharged beneath the bed of fuel, or for the purpose of increasing the secondary combustion such as is the case when such products of combustion are passed into the combustion chamber above the bed of fuel. It will also be apparent that the order of the steps taken in carrying out my invention may be changed, and that certain of the steps may be omitted.

It will now be apparent that I have devised a novel construction, by the employment of which the unconsumed products of combustion which pass from the combustion chamber are treated in such a manner that a large proportion of the unutilized heat and carbon is recovered and that the gases are then conveyed to the combustion chamber and before entering the combustion chamber they are enriched by mixing the same with atomized liquid fuel. By such means I am enabled to utilize practically all of the heat units of the fuel with consequent decrease in the cost of furnace operation. It will also be apparent that by the employment of my novel construction the passage of smoke to the atmosphere, as well as the necessity of employing a high furnace stack, is entirely eliminated.

In some cases arising in practice it is advantageous to employ compressed air for atomizing the liquid hydro-carbon passing to the atomizer 32, and in such cases I provide a valve controlled pipe 39 which leads to a source of air under pressure.

It will be understood that in case the unconsumed products of combustion are discharged beneath the grates 2, the enrichment of the unconsumed products of combustion or liquid hydro-carbon is dispensed with, but in case the unconsumed products of combustion are discharged into the combustion chamber above the bed of fuel, it is desirable, in practically all cases, to enrich the unconsumed products of combustion with atomized liquid hydro-carbon prior to the entrance of such unconsumed products of combustion into the combustion chamber above the bed of fuel.

Special attention is directed to the fact that prior to the admission of the unconsumed products of combustion into either the ash pit or the combustion chamber above the bed of fuel, they are preheated in any desired manner and, as shown, they are preheated by locating the conduit, through which they pass, in the ash pit, but it is of course to be understood that in the broad scope of my invention these unconsumed products of combustion may be heated in any desired manner. It will also be seen that in case the unconsumed products of combustion are discharged beneath the bed of fuel, they serve to agitate combustion. The relief valve may be located at any desired point.

It will be apparent that in accordance with my novel method, that the unutilized heat which normally escapes from the furnace through the furnace stack is recovered, since such heat, together with the unconsumed products of combustion, is treated in such a manner as to form a combustible mixture, and is thereafter employed to increase the combustion.

It will now be apparent that I have devised a novel method of operating a furnace which embodies the features of advantage enumerated as desirable in the statement of invention and the foregoing description, and while I have, in the present instance, illustrated and described a preferred embodiment for carrying out my novel method in practice, it will be apparent that the same is susceptible of modification in various particulars without departing from the spirit or scope of the invention or sacrificing any of its advantages.

Having thus described my invention, what I claim as new and desire to secure by Letters Patent, is:—

1. The method of operating a furnace, which consists in injecting air into the unconsumed products of combustion as they pass from the furnace, treating the resultant mixture with liquid to deposit the carbon therefrom, enriching said gases with hydrocarbon, then heating the purified gases, and conducting them into the combustion chamber above the bed of fuel.

2. The method of operating a furnace, which consists in injecting air into the unconsumed products of combustion and escaping heat as they pass from the furnace, then treating such mixture with water to precipitate the carbon, enriching such gases with hydrocarbon injected thereinto by steam pressure, and then heating the gases and causing them to pass into the furnace above and below the bed of fuel.

3. The method of operating a furnace which consists in forcing air into the unconsumed products of combustion, and heat products escaping from the furnace to impart a travel thereto, then removing the free carbon therefrom, then injecting into the purified gases hydrocarbon, and then discharging the enriched gases into the furnace above the bed of fuel.

4. The method of operating a furnace, which consists in forcing air into the unconsumed products of combustion, and heat products escaping from the furnace to impart a travel thereto, then removing the free carbon therefrom, then injecting into the purified gases hydrocarbon, and then discharging the enriched gases into the furnace above and below the bed of fuel.

5. The method of operating a furnace, which consists in forcing air into the unconsumed products of combustion and heat products from the furnace to impart a travel thereto, then removing the free carbon therefrom, then injecting into the purified gases hydrocarbon, and then discharging the enriched gases into the furnace below the bed of fuel.

MORRIS ROSENBAUM.

Witnesses:
H. S. FAIRBANKS,
C. D. McVAY.